US010170246B2

United States Patent
Ahn et al.

(10) Patent No.: US 10,170,246 B2
(45) Date of Patent: Jan. 1, 2019

(54) CAPACITOR COMPONENT WITH METALLIC PROTECTION PATTERN FOR IMPROVED MECHANICAL STRENGTH AND MOISTURE PROOF RELIABILITY

(71) Applicant: SAMSUNG ELECTRO-MECHANICS CO., LTD., Suwon-si, Gyeonggi-do (KR)

(72) Inventors: Jin Mo Ahn, Suwon-si (KR); Sun Cheol Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/641,990

(22) Filed: Jul. 5, 2017

(65) Prior Publication Data
US 2018/0182551 A1   Jun. 28, 2018

(30) Foreign Application Priority Data
Dec. 22, 2016  (KR) .................. 10-2016-0176541

(51) Int. Cl.
*H01G 4/30*      (2006.01)
*H01G 4/005*    (2006.01)
*H01G 4/232*    (2006.01)

(52) U.S. Cl.
CPC .............. *H01G 4/232* (2013.01); *H01G 4/30* (2013.01)

(58) Field of Classification Search
None
See application file for complete search history.

(56) References Cited

U.S. PATENT DOCUMENTS

2006/0203420 A1*  9/2006  Okuyama .............. H01G 4/232
                                                                    361/271
2006/0250747 A1   11/2006  Takashima et al.
(Continued)

FOREIGN PATENT DOCUMENTS

JP    H09-129476 A    5/1997
JP    3747940 B2      2/2006
(Continued)

OTHER PUBLICATIONS

Korean Office Action dated Jun. 18, 2018 issued in Korean Patent Application No. 10-2016-0176541 (with English translation).

*Primary Examiner* — Dion Ferguson
(74) *Attorney, Agent, or Firm* — McDermott Will & Emery LLP

(57) ABSTRACT

A capacitor component includes a body including a plurality of dielectric layers having a stacked structure, and first and second internal electrodes which are alternately disposed while having the dielectric layer interposed therebetween; and first and second external electrodes formed on an outer surface of the body, and connected to the first and second internal electrodes, respectively, wherein the body includes an active region having capacity by the first and second internal electrodes and a cover region located above and below the active region, the cover region includes a protection pattern of a metal material connected to the first external electrode or the second external electrode, and the protection pattern does not overlap with the internal electrode having a different polarity among the first and second internal electrodes in a thickness direction of the body.

15 Claims, 3 Drawing Sheets

(56) References Cited

U.S. PATENT DOCUMENTS

| | | | | |
|---|---|---|---|---|
| 2009/0316330 A1* | 12/2009 | Taniguchi | ............... | H01G 4/012 361/306.3 |
| 2014/0240895 A1* | 8/2014 | Lee | ........................ | H01G 4/12 361/301.4 |
| 2015/0255213 A1* | 9/2015 | Lee | ........................ | H01G 4/008 174/258 |
| 2016/0240317 A1* | 8/2016 | Ro | ........................... | H01G 4/30 |

FOREIGN PATENT DOCUMENTS

| | | |
|---|---|---|
| JP | 2007-036003 A | 2/2007 |
| JP | 5482763 B2 | 5/2014 |

* cited by examiner

CAPACITOR COMPONENT WITH METALLIC PROTECTION PATTERN FOR IMPROVED MECHANICAL STRENGTH AND MOISTURE PROOF RELIABILITY

CROSS-REFERENCE TO RELATED APPLICATION(S)

This application claims benefit of priority to Korean Patent Application No. 10-2016-0176541, filed on Dec. 22, 2016 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor, which is a capacitor component, is a chip type condenser mounted on a printed circuit board in several electronic products, such as an imaging device, for example, a liquid crystal display (LCD), a plasma display panel (PDP), and the like, or in a computer, a smartphone, a cellular phone, and the like, to charge or discharge electricity.

The multilayer ceramic capacitor (MLCC) may be used as a component in these various electronic devices because of its advantages of small size, high capacitance, and easy mountable function. The multilayer ceramic capacitor used in mobile devices, automobiles, and the like has recently been required to have a high level of mechanical strength also in order to withstand harsh environments such as external and repeated forces, vibrations, severe temperature and humidity, and the like.

SUMMARY

An aspect of the present disclosure may provide a capacitor component having improved mechanical strength and moisture proof reliability while promoting stability of electrical characteristics.

According to an aspect of the present disclosure, a capacitor component may include a body including a plurality of dielectric layers having a stacked structure, and first and second internal electrodes which are alternately disposed while having the dielectric layer interposed therebetween; and first and second external electrodes formed on an outer surface of the body, and connected to the first and second internal electrodes, respectively, wherein the body includes an active region having capacity by the first and second internal electrodes and a cover region located above and below the active region, the cover region includes a protection pattern of a metal material connected to the first external electrode or the second external electrode, and the protection pattern does not overlap with an internal electrode having a different polarity among the first and second internal electrodes in a stacking direction of the body.

A length of the protection pattern measured from a side surface of the body, at which the first and second internal electrodes and the first and second external electrodes are connected, may be shorter than a distance of each end of the internal electrodes to the side surface of the body.

The protection pattern may be a plate shape.

The protection pattern may be disposed in the entire region of at least one corner of the body.

The protection pattern may have a shape having a width greater than the first and second internal electrodes.

The body may have a rectangular parallelepiped shape, and the protection pattern may be formed in four corners of the body.

A plurality of protection patterns may be layered in the stacking direction of the body.

The protection pattern may be exposed to only side surfaces of the body.

The protection pattern may be exposed from at least one of a top surface and a bottom surface of the body.

The protection pattern may be exposed to the at least one of the top surface and the bottom surface of the body to be in contact with the first external electrode or the second external electrode.

The protection pattern may be one side surface exposed to the body to be in contact with the first external electrode or the second external electrode.

Each of the first and second external electrodes may extend from a side surface of the body and cover portions of a top surface and a bottom surface of the body.

A length of an extended portion of the first and second external electrodes maybe greater than a length of the protection pattern measured from the side surface of the body.

The protection pattern may be formed of a material identical to that of the first and second internal electrodes.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
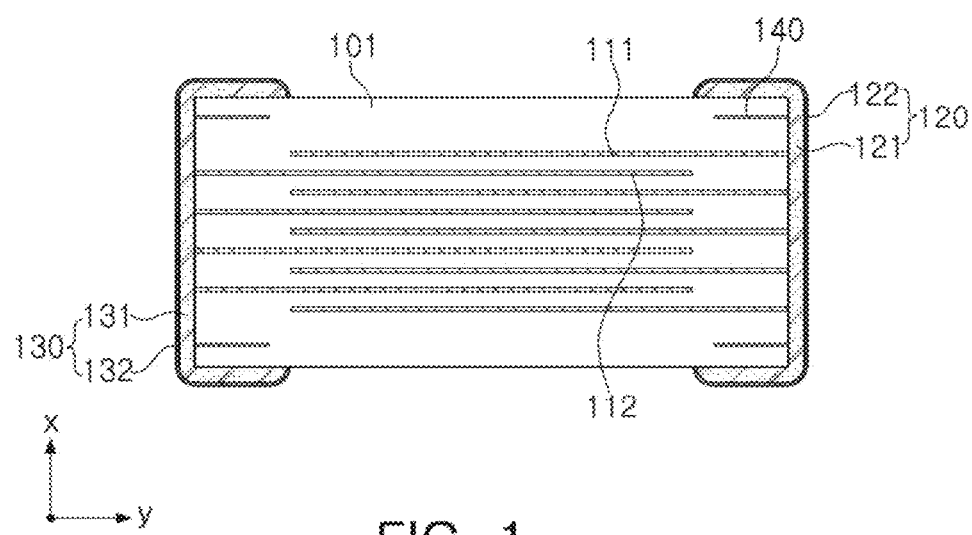
FIG. 1 is a cross-sectional view schematically illustrating a capacitor component according to an exemplary embodiment in the present disclosure.
Figure 2:
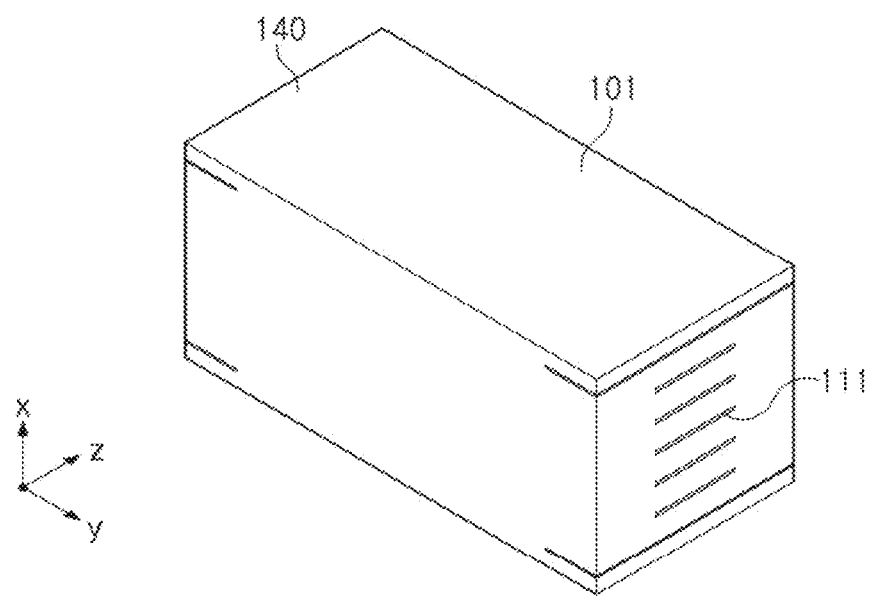
FIG. 2 is a perspective view schematically illustrating a form of a body in the capacitor component of FIG. 1.
Figure 3:
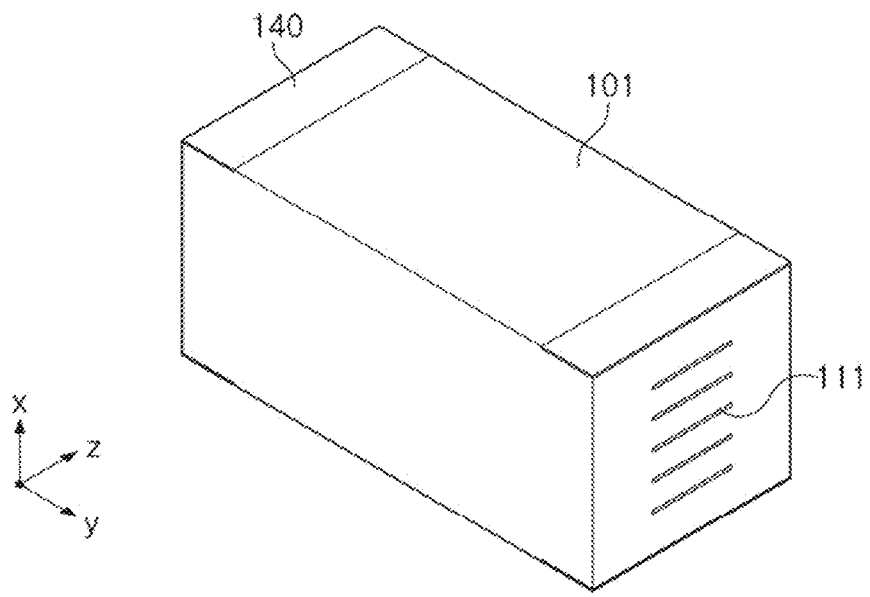
FIGS. 3 through 5 illustrate capacitor components according to examples modified from the exemplary embodiment of FIG. 1.
Figure 4:
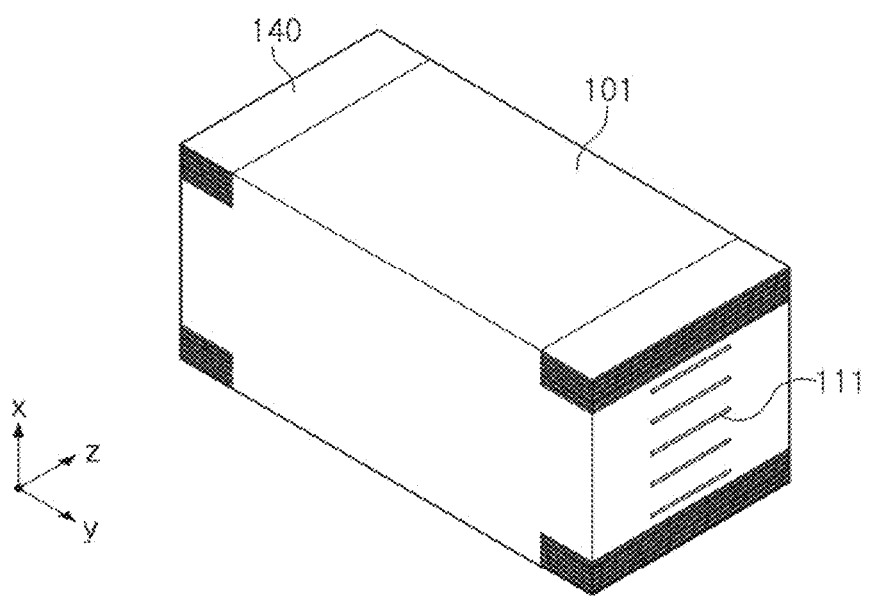
Figure 5:
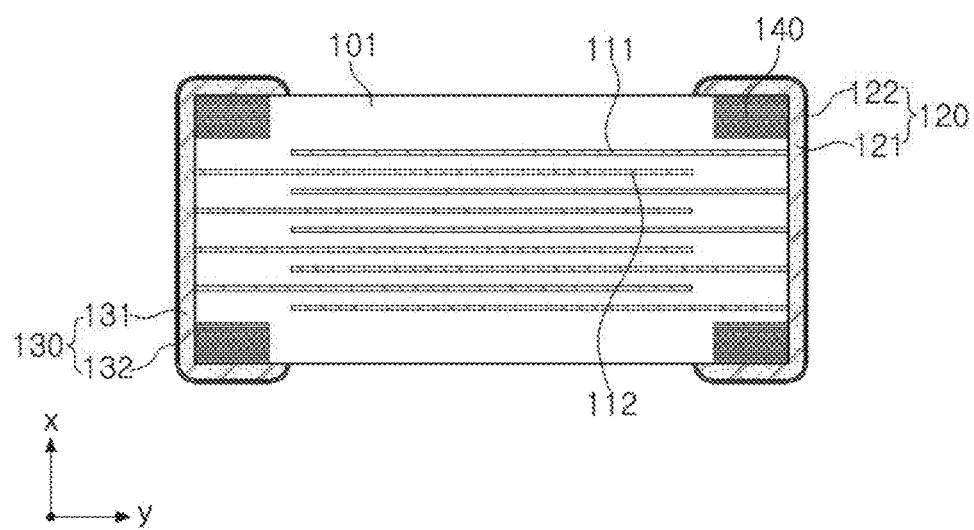

FIG. 1 is a cross-sectional view schematically illustrating a capacitor component according to an exemplary embodiment in the present disclosure. FIG. 2 is a perspective view schematically illustrating a form of a body in the capacitor component of FIG. 1. FIGS. 3 through 5 illustrate capacitor components according to examples modified from the exemplary embodiment of FIG. 1.

Referring to FIGS. 1 and 2, a capacitor component 100 according to an exemplary embodiment in the present disclosure may include, as main components, a body 101, first and second internal electrodes 111 and 112 included in the body 101, a protection pattern 140, and first and second external electrodes 120 and 130. According to the present exemplary embodiment, since a metallic protection pattern 140 is disposed on a cover region of the body 101 as described below to reduce cracks, permeation of moisture, and the like which are generated in corners of the capacitor component 100, reliability of the capacitor component 100 may be improved.

The body 101 may include a plurality of dielectric layers having a stacked structure, and the first and second internal electrodes 111 and 112 which are alternately disposed while having the dielectric layer interposed therebetween. In this case, as illustrated in FIG. 2, the body 101 may have a hexahedral shape or a shape similar thereto. As the dielectric layer included in the body 101, a dielectric material such as a ceramic, or the like known to the art may be used. For example, the dielectric material may include barium titanate ($BaTiO_3$) based ceramic powder, or the like. In this case, the $BaTiO_3$ based ceramic powder may include, for example, $(Ba_{1-x}Ca_x) TiO_3$, $Ba (Ti_{1-y}Ca_y) O_3$, $(Ba_{1-x}Ca_x) Ti_{1-y}Zr_y) O_3$, or $Ba (Ti_{1-y}Zr_y) O_3$ in which calcium (Ca), zirconium (Zr), or the like, is partially dissolved in $BaTiO_3$, but is not limited thereto.

The body 101 may be divided into an active region forming electric capacity and a cover region located above and below the active region. Specifically, in FIG. 1, the active region may form capacity by the first and second internal electrodes 111 and 112, and the cover region may be disposed above and below the active region. In this case, the cover region may serve to prevent the first and second internal electrodes 111 and 112 from being damaged due to physical or chemical stress, and may have substantially the same material and configuration as the dielectric layer of the active region except that it does not include the internal electrodes 111 and 112. In this case, the cover region may be obtained by an operation of stacking and sintering green sheets. The cover region may be implemented in a form in which one or more green sheets are stacked on top and bottom surfaces of the active region and are then sintered.

The first and second internal electrodes 111 and 112 may be alternately disposed to face each other while having the dielectric layer configuring the body 101 interposed therebetween, and may be exposed to both end surfaces of the body 101. In this case, the first and second internal electrodes 111 and 112 may be electrically insulated from each other by the dielectric layer disposed therebetween. A material forming the first and second internal electrodes 111 and 112 is not particularly limited, but may be formed by using a conductive paste formed of, for example, a noble metal such as palladium (Pd), an palladium-silver (Pd—Ag) alloy, and the like, and at least one of nickel (Ni) and copper (Cu). As a printing method for the conductive paste, a screen printing method, a gravure printing method, or the like, may be used. However, the present disclosure is not limited thereto. In addition, thicknesses of the first and second internal electrodes 111 and 112 may be appropriately determined according to the usage purposes, and are not particularly limited. For example, the thicknesses of the first and second internal electrodes 111 and 112 may be 0.1 to 5 μm or 0.1 to 2.5 μm.

The first and second external electrodes 120 and 130 may be formed on an outer surface of the body 101, and connected to the first and second internal electrodes 111 and 112, respectively. In this case, the first and second external electrodes 120 and 130 may have a multilayer structure, for example, first layers 121 and 131 and second layers 122 and 132. Here, the first layers 121 and 131 may be formed as a sintering electrode obtained by sintering the conductive paste, and the second layers 122 and 132 may include one or more plated layers. In addition, the first and second external electrodes 120 and 130 may include additional layers other than the first layers 121 and 131 and the second layers 122 and 132. For example, the first and second external electrodes 120 and 130 may include a conductive resin electrode between the first layers 121 and 131 and the second layers 122 and 132 to alleviate mechanical shock, or the like.

According to the present exemplary embodiment, a protection pattern 140 may be disposed on the cover region. The protection pattern 140 may be connected to the first external electrode 120 or the second external electrode 130. The present exemplary embodiment illustrates the protection pattern 140 connected to both the first and second external electrodes 120 and 130. The protection pattern 140 may be formed of a metal material, and may be formed of, for example, the same material as the first and second internal electrodes 111 and 112. In addition, the protection pattern 140 may be obtained by the same manufacturing process as the first and the second internal electrodes 111 and 112, which may be, for example, applying a conductive paste for first and second internal electrodes 111 and 112 onto the green sheet. The protection pattern 140 obtained as described above may have the same thickness as the first and the second internal electrodes 111 and 112. However, the thickness of the protection pattern 140 may be appropriately adjusted in consideration of an intended protection function, a specification of the capacitor component 100, or the like.

Because the protection pattern 140 formed of the metal material is applied for the cover region, cracks that may occur in corners of the capacitor component 100 may be reduced. This is because strength of the capacitor component 100 is improved by the protection pattern 140 and densification of a ceramic material may be rapidly performed during an operation of sintering the ceramic material forming the body 101. In addition, since the densification of the ceramic material is increased around the protection pattern 140, ingress of moisture into the capacitor component 100 from the outside may be reduced, which may lead to improve reliability of the capacitor component 100.

In addition, side margin regions in which the internal electrodes 111 and 112 are not formed in the active region may be contracted and depressed during the sintering operation due to low density of the internal electrodes 111 and 112. However, by applying the protection pattern 140 to the corners of the body 101 as in the above exemplary embodiment, the contraction and depression phenomenon at the side margin regions of the body 101 may be reduced.

Meanwhile, the protection pattern 140 may not overlap with an internal electrode having a different polarity among the first and second internal electrodes 111 and 112 with respect to a stacking direction. In other words, a portion (located at the right in FIG. 1) of the protection pattern 140 connected to the first external electrode 120 may overlap with the second internal electrode 112 in a stacking direction (x direction in FIG. 1). Accordingly, since generation of unnecessary or unintended electric capacity may be significantly reduced by the protection layer 140, electric characteristics of the capacitor component 100 may become stable. In order to prevent the protection pattern 140 from overlapping with the internal electrodes 111 and 112 having different polarities, a length of the protection pattern 140 in a y direction may be provided to be shorter than a distance of each end of the internal electrodes 111 and 112 in the y direction to an adjacent side surface of the body 101, as illustrated in FIG. 1.

In addition, the first and second external electrodes 120 and 130 may extend to top and bottom surfaces of the body 101 from the side surfaces of the body 101. In this case, as illustrated in FIG. 1, a length (in the y direction) of the above extended portions of the first and second external electrodes 120 and 130 maybe greater than a length of the protection pattern 140 measured from the side surface of the body 101.

Meanwhile, the protection pattern 140 may be adopted in a plate shape as illustrated in FIG. 2, in consideration of the above-mentioned function of the protection pattern 140. In this case, in order to secure a sufficient protection function, the protection pattern 140 may be formed across the entire region of at least one corner of the body 101 in a z direction in FIG. 2. In this case, a width (in the z direction) of the protection pattern 140 may be greater than that of the first and second internal electrodes 111 and 112.

In addition, in order to sufficiently perform the protection function, the protection pattern 140 may be formed on four corners in the body 101 having a rectangular parallelepiped shape.

Although the exemplary embodiment of FIG. 2 illustrates the case in which only the side surfaces of the protection pattern 140 are exposed to the outer surface of the body 101, the protection pattern 140 may be exposed to at least one of the top and bottom surfaces of the body 101. Specifically, as illustrated in a modified example of FIG. 3, a protection pattern 140 may be exposed to a top surface or a bottom surface of a body 101, and may be connected to external electrodes 120 and 130 through the exposed surface of the protection pattern 140. In this case, the protection pattern 140 may also be in contact with a first external electrode 120 or a second external electrode 130 through one side surface exposed from the body 101 in addition to the top surface or the bottom surface of the body 101.

As illustrated in the exemplary embodiment of FIG. 3, the structure in which the protection pattern 140 is exposed to the top and bottom surfaces of the body 101 and is in contact with the external electrodes 120 and 130 may correspond to a structure in which the protection pattern 140 is disposed on a region vulnerable to ingress of moisture. Therefore, moisture proof reliability may be further improved, and mechanical stability may also be improved due to excellent adhesion between the protection pattern 140 and the external electrodes 120 and 130.

Although the exemplary embodiment describe above illustrates the structure in which one protection pattern 140 is formed in each of the corners of the body 101, a plurality of protection patterns 140 may be provided as in modified examples of FIGS. 4 and 5. Specifically, a plurality of protection patterns 140 may be provided in each of corners of a body 101, and the plurality of protection patterns 140 may be stacked in a stacking direction of the body 101. In this case, similar to the above-mentioned exemplary embodiment, a protection pattern disposed in the outermost portion among the plurality of protection patterns 140 may be exposed to a top surface or a bottom surface of the body 101 and may be in contact with external electrodes 120 and 130. Accordingly, moisture proof reliability and mechanical stability may be improved. As in the exemplary embodiments of FIGS. 4 and 5, the plurality of protection patterns 140 are used, whereby the above-mentioned functions of the protection pattern 140, that is, the moisture ingress prevention, the crack prevention, the mechanical strength improvement, and the like may be more effectively implemented.

As set forth above, according to the exemplary embodiments in the present disclosure, the capacitor component having improved mechanical strength and moisture proof reliability while promoting stability of electrical characteristics may be obtained. Various advantages and effects of the present disclosure are not limited to the description above, and may be more readily understood in the description of exemplary embodiments in the present disclosure.

While exemplary embodiments have been shown and described above, it will be apparent to those skilled in the art that modifications and variations could be made without departing from the scope of the present invention as defined by the appended claims.

What is claimed is:

1. A capacitor component comprising:
a body including a plurality of dielectric layers having a stacked structure, and first and second internal electrodes which are alternately disposed while having the dielectric layer interposed therebetween; and
first and second external electrodes formed on an outer surface of the body, and connected to the first and second internal electrodes, respectively,
wherein the body includes an active region having capacity by the first and second internal electrodes and a cover region located above and below the active region,
the cover region includes a protection pattern of a metal material having a plate shape connected to the first external electrode or the second external electrode,
the protection pattern does not overlap with an internal electrode having a different polarity among the first and second internal electrodes in a stacking direction of the first and second internal electrodes, and
the protection pattern has a shape having a width greater than that of either of the first and second internal electrodes.

2. The capacitor component of claim 1, wherein a length of the protection pattern measured from a side surface of the body, at which the first and second internal electrodes and the first and second external electrodes are connected, is shorter than a distance from each end of the internal electrodes to the side surface of the body.

3. The capacitor component of claim 1, wherein the protection pattern is disposed in an entire region of at least one corner of the body.

4. The capacitor component of claim 1, wherein the body has a rectangular parallelepiped shape, and
the protection pattern is formed in four corners of the body.

5. The capacitor component of claim 1, wherein a plurality of protection patterns are layered in the stacking direction of the first and second internal electrodes.

6. The capacitor component of claim 1, wherein the protection pattern is exposed to only side surfaces of the body.

7. The capacitor component of claim 1, wherein the protection pattern is exposed from at least one of a top surface and a bottom surface of the body.

8. The capacitor component of claim 7, wherein the protection pattern is exposed to the at least one of the top surface and the bottom surface of the body to be in contact with the first external electrode or the second external electrode.

9. The capacitor component of claim 8, wherein the protection pattern is exposed to one side surface of the body to be in contact with the first external electrode or the second external electrode.

10. The capacitor component of claim 1, wherein each of the first and second external electrodes extends from a side surface of the body and covers portions of a top surface and a bottom surface of the body.

11. The capacitor component of claim 10, wherein a length of an extended portion of the first and second external electrodes is greater than a length of the protection pattern measured from the side surface of the body.

12. The capacitor component of claim 1, wherein the protection pattern is formed of a material identical to that of the first and second internal electrodes.

13. A capacitor component comprising:
a body including a plurality of dielectric layers having a stacked structure, and a plurality of first internal electrodes and a plurality of second internal electrodes which are alternately disposed while having the dielectric layer interposed therebetween;
a first external electrode disposed on a first outer surface of the body, and connected to the plurality of first internal electrodes;
a second external electrode disposed on a second outer surface of the body opposing the first outer surface of the body and connected to the plurality of second internal electrodes,
wherein the body includes an active region defined by the plurality of first and the plurality of second internal electrodes and a cover region located above and below the active region, and
the cover region includes
a first metallic protection pattern having a plate shape connected to the first external electrode and not overlapping with the plurality of second internal electrodes in a stacking direction of the plurality of first and second internal electrodes, and
a second metallic protection pattern connected to the second external electrode and not overlapping with the plurality of first internal electrodes in the stacking direction of the plurality of first and second internal electrodes,
wherein the protection pattern has a shape having a width greater than that of either of the first and second internal electrodes.

14. The capacitor component of claim 13, wherein a length of the first metallic protection pattern measured from the first outer surface of the body is shorter than a distance from an end of the plurality of first internal electrodes to the first outer surface of the body.

15. The capacitor component of claim 13, wherein a length of the second metallic protection pattern measured from the second outer surface of the body is shorter than a distance from an end of the plurality of second internal electrodes to the second outer surface of the body.

* * * * *